United States Patent [19]

[11] 4,004,155

Nercessian

[45] Jan. 18, 1977

[54] BIPOLAR REGULATED HIGH VOLTAGE POWER SUPPLY

[75] Inventor: Sarkis Nercessian, Flushing, N.Y.

[73] Assignee: Forbro Design Corporation, New York, N.Y.

[22] Filed: Oct. 3, 1975

[21] Appl. No.: 619,444

[52] U.S. Cl. .................................... 307/52; 307/72

[51] Int. Cl.² .......................................... H02J 3/38

[58] Field of Search .................. 307/52, 72, 75, 43, 307/51, 44

[56] References Cited

UNITED STATES PATENTS 2,772,387 11/1956 Liguori ............................ 307/72 X

*Primary Examiner*—Herman J. Hohauser
*Attorney, Agent, or Firm*—Alfred W. Barber

[57] ABSTRACT

Two sources of current are applied to a load. One source supplies a constant current which is at least equal to the maximum current to be supplied to the load in one polarity. The second source is in opposition to the first source and is capable of being controlled from zero to a value at least double the value of the constant current. A voltage feedback circuit in combination with a bipolar control signal provides a bipolar voltage across the load having maximum positive and negative voltage excursions equal to the control signal times the feedback circuit gain and current in either direction having a maximum value substantially equal to the constant current value. In this manner a high voltage regulated bipolar voltage can be controlled across a load using one controlled unipolar device while providing class A operation, that is, without cross-over distortion. An important feature of the invention is the positive and negative limiting of both load voltage and load current.

5 Claims, 6 Drawing Figures

BIPOLAR REGULATED HIGH VOLTAGE POWER SUPPLY

PRIOR ART

In the past, class A bipolar operation has been provided using vacuum tubes or transistors and phase inverting transformers. Such circuits could not respond to direct current and so were quite unsuited to power supply use. When complementary transistors (PNP and NPN) became available, complementary symmetry bipolar circuits responding to direct current were possible. One example of the latter in a power supply configuration is shown and described in U.S. Pat. No. 3,566,292. The circuitry is complicated by the necessity for driving two output control devices, one in one direction and the other in the other direction. Furthermore, positive and negative limiting of the output voltage or current has been awkward and not easily adjusted or programmed.

SUMMARY

It has been found possible to provide a well regulated, cross-over distortion free bipolar output using a source of constant current in conjunction with one programmed unipolar device. The source of constant current must supply the maximum load current in one polarity and have a compliance range equal to the maximum required output voltage. The source of constant current need not be well regulated since the essential regulation and control is provided by the second source of current. The second source of current is feedback regulated from the load voltage or current and must supply at least twice the maximum load current at the maximum load voltage or current. The second source receives a bipolar input programming voltage and the feedback circuit sets the voltage gain to the load.

In operation, the constant current source supplies a constant current to the load at the maximum rated load voltage. If the second source is cut off, the load voltage and current are maximum in the polarity direction of the constant current source. In order to control the load voltage, a programmable second source of current poled oppositely to the constant current source is also connnected across the load. It can now be seen that if the second source is cut off, the load voltage and current will be maximum in one polarity; if the current from the second source equals the constant current, the load voltage and current will be zero; and if the current from the second source is twice the constant current, the load voltage and current will be maximum with a polarity opposite to that of the polarity of the first current source. Thus, by controlling the second source with a bipolar input voltage, the load voltage will be programmed bipolar from maximum in one polarity to maximum in the opposite polarity. Since there is no discontinuity at cross-over, the system operates class A showing no cross-over distortion.

Figure 1:
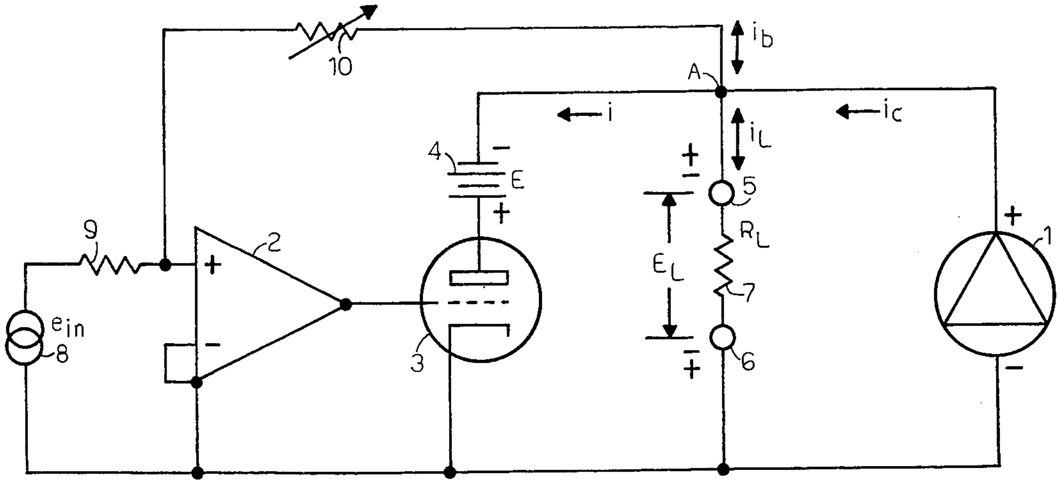
FIG. 1 is a simplified circuit diagram of the basic form of the present invention.

FIG. 1 is a circuit in which a source of constant current 1 and a unipolar voltage regulating circuit including control amplifier 2, pass the tube 3 and unregulated voltage source 4, are connected in parallel across a pair of load terminals 5 and 6. A load such as resistor 7 to be supplied with regulated voltage is connected between load terminals 5 and 6. The voltage regulating circuit is completed by a source of input or programming voltage 8, a reference or input resistor 9 and a feedback or gain control resistor 10. The input voltage 8 is symbolically represented as an alternating current voltage since the system is intended to accept a bipolar input or control voltage and to deliver to the load terminals and load a regulated bipolar voltage. The load voltage will be:

$$E_L = e_{in} \frac{R_{10}}{R_9} \qquad R_{10} = \text{resistance of 10} \quad R_9 = \text{resistance of 9}$$

as in the familiar bridge regulated power supply. The bipolar capability is provided by the use of the constant current source.

Considering the currents entering and leaving junction point A, constant current source 1 provides a constant current $i_c$, pass tube 3 draws a regulating current $i$, a small bridge current $i_b$ flows through resistor 10 and a load current $i_L$ flows through load resistance $R_L$. Neglecting $i_b$ the load current is $i_1 = i_c - i$. It will be seen that if $i$ is less than $i_c$, the current will flow downward through load $R_L$ and terminal 5 will be positive with respect to terminal 6 while if $i$ is greater than $i_c$, the current flow and polarity will be reversed. Thus, by controlling $i$ from 0 to $2i_c$ the load can be controlled from a current equal to $i_c$ in one direction to $-i_c$ in the opposite direction. The load voltage can be controlled to be bipolar by controlling the unipolar current $i$ in the presence of a constant current $i_c$ also unipolar.

The above seems to imply that load current $i_L$ is necessary in programming load voltage. Actually load voltage may be controlled in the absence of load current ($R_L$ infinite) due to the presence of the bridge current $i_b$ which, in fact, determines the load voltage and its polarity. In such case the constant current $i_c$ flows through regulating elements 3 and 4. It should be noted that when $i = i_c$, the load current (and hence voltage) is zero but since there is no discontinuity at this point, there is no cross-over distortion. In other words, two unipolar control devices are capable of providing a regulated bipolar voltage at a load without cross-over distortion.

Figure 2:
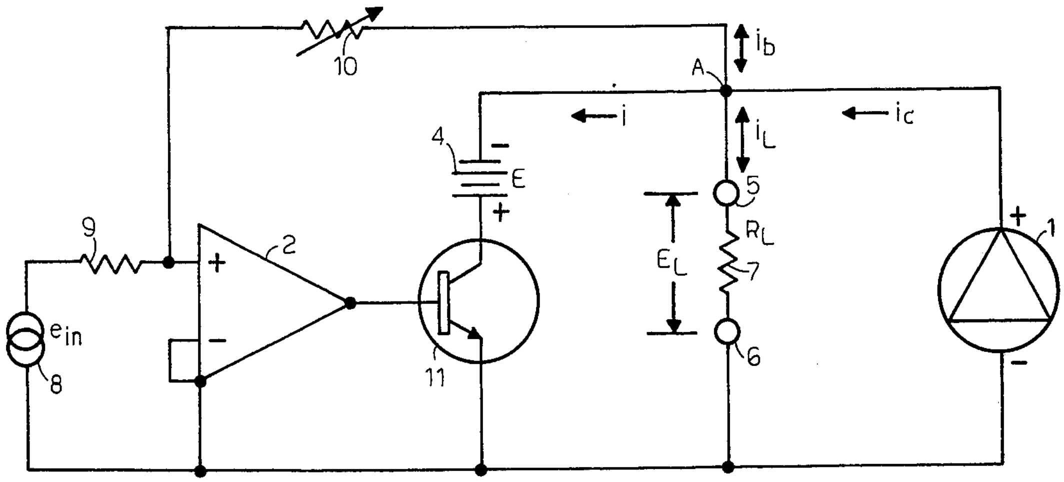
FIG. 2 is a simplified circuit diagram of the form of FIG. 1 employing a transistor rather than vacuum tube for controlling the load voltage.

FIG. 2 is similar to FIG. 1 and operates in the same way except the unidirectional control device is transistor 11 instead of the vacuum tube 3. The operation is otherwise the same as described above in connection with FIG. 1 and the same numerals are used to designate corresponding components of the circuit.

Figure 3:
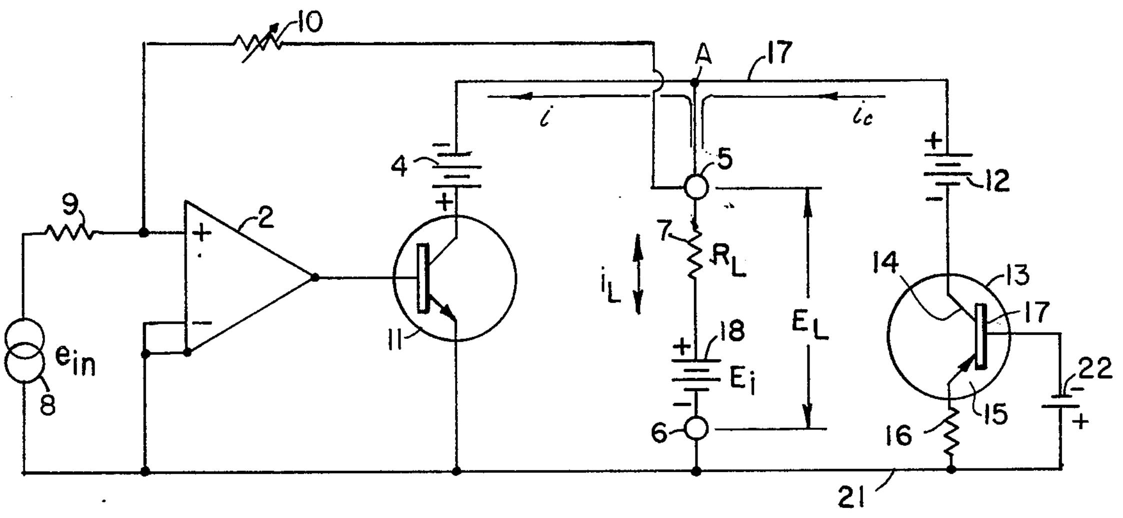
FIG. 3 is similar to FIG. 2 except details of one form of constant current source are shown.

FIG. 3 is similar to FIG. 2 but with the addition of details of one form of constant current circuit which may be employed as the constant current source 1. The constant current source comprises a source of dc voltage represented by battery 12 with the positive terminal connected to load terminal 5. A transistor 13 including a collector 14, an emitter 15 and a base 17 is connected with collector 14 connected to the negative terminal of voltage source 12, emitter 15 connected through a fixed resistor 16 to load terminal 6 over lead 21, and base 17 connected to a source of reference voltage 22. The constant current provided by this circuit is approximately equal to the voltage across battery 22 divided by the resistance of resistor 16. The constant current so provided (*ic*) will be maintained as long as the voltage source as represented by battery 12 is sufficient to sustain the load voltage called for by the control circuit (2-4-8-9-10-11). As explained above, this is a bipolar circuit providing current through the load in either direction all controlled by a unipolar control circuit.

FIG. 3 illustrates one further point with respect to the operation of the invention. This is operation with an active load. A passive load would be one such as resistor 7 connected *b* between load terminals 5 and 6. Such a load will provide two quadrant operation of the E, I output domain, more fully explained below. However, the addition of a source of voltage such as that represented by battery 18 in series with the load resistor provides what may be termed an "active load" and may cause the power supply to operate in two additional quadrants of the E, I domain.

Figure 4:
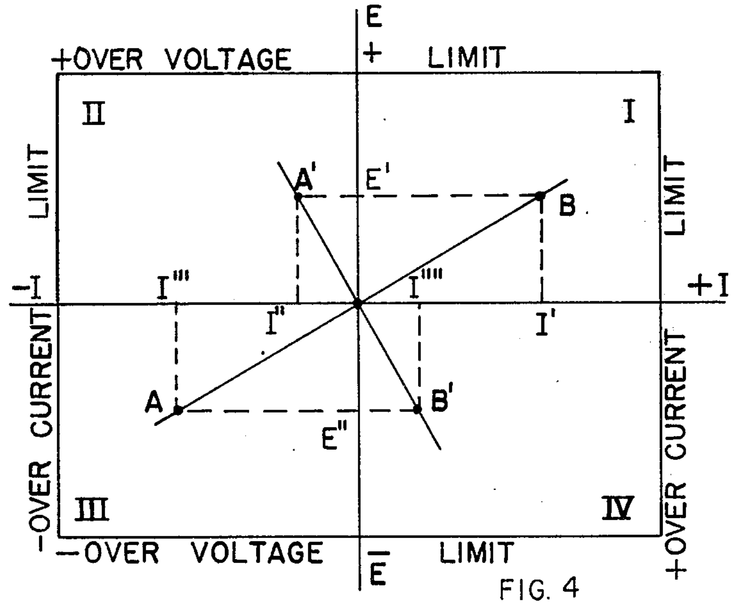
FIG. 4 is a graphical representation of four quadrant operation of the circuit of the invention.

FIG. 4 taken with FIG. 3 may be used to explain passive and active load operation, Let E′ be a positive voltage programmed across load terminals 5–6 and E″ a negative voltage also programmed across the load terminals. With $E_1$ absent or zero the positive voltage E′ will cause a current I′ to flow in load resistor 7 ($R_L$) found by the intersection of voltage line E′ with load line AB. Similarly, the negative voltage E″ will cause a negative current I″ to flow through the load resistor as determined by the intersection of the E″ voltage line with the load line AB at A. This defines operation in quadrant I and III.

An active load, as stated above, is one having a voltage in series with the load such at that represented by battery 18 in FIG. 3. Now if active voltage $E_1$ is greater than E′ or E″, the direction of current will be reversed becoming negative (I″) for E′ and positive (I‴′) for the negative voltage E″ as defined by points A′ and B′ on load line A′B′. This operation takes place in quadrants II and IV respectively.

It has been found that the above described four quadrant operation requires novel operating restraints. First, voltage and current limiting must be supplied in four quadrants i.e. positive voltage limiting, negative voltage limiting, positive current limiting and negative current limiting. Second, it has been found in a system such as the one being described that if one applied simultaneous bipolar voltage and bipolar current programming, undesirable or impractical conditions can develop. Accordingly, an important feature of the present invention is the provision for selecting, exclusively, voltage or corrent bipolar programming while maintaining positive and negative current and voltage limiting. Furthermore, the current and voltage limits are all independently settable providing limiting in all four quadrants of operation. Characteristic upper and lower voltage and current limit lines are shown on FIG. 4. How they are implemented is described below.

Figure 5:
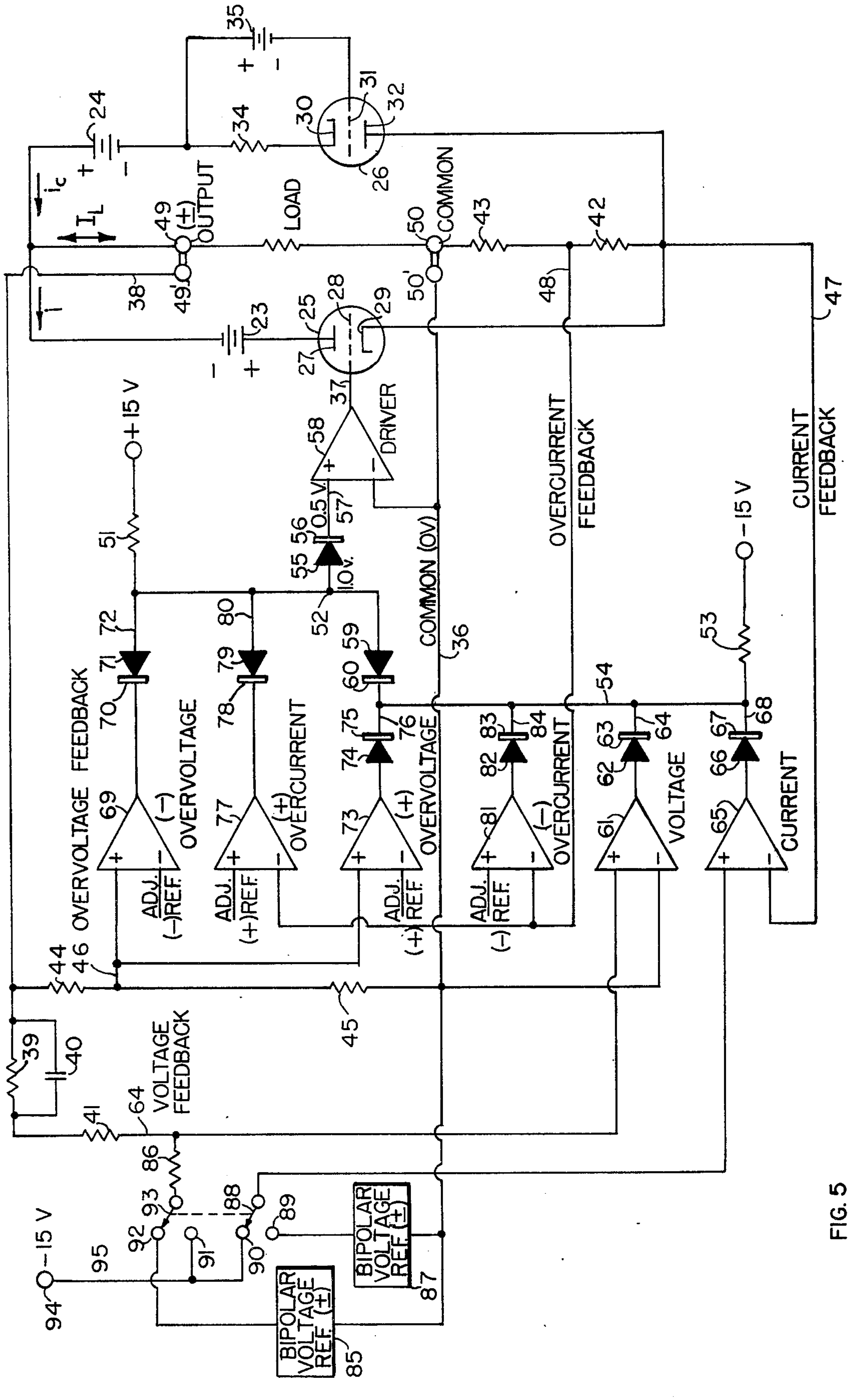
FIG. 5 is a simplified circuit diagram of the preferred form of the invention.

The following general remarks provide a background for the specifics of FIG. 5. In the voltage mode of operation, the voltage feedback is taken from the load in such a manner that the control tube 25 introduces a 180° phase inversion. On the other hand, the current mode operation uses a feedback from resistors connected in the cathode circuit of the control tube and there is no phase inversion due to the control tube. Since the power supply in either mode must operate with overall degenerative feedback (total 180° phase shift) the amplifiers preceeding the gates and operating on the voltage mode amplifier have feedback returned to non-inverting inputs while the amplifiers operating on current mode have feedback returned to inverting inputs.

Assuming for the sake of explanation of the circuit operation that a predetermined point at the junction of all control gates is to be maintained at a predetermined potential, say plus 1 volt, the various gates must be connected so that they tend to hold this point down to 1 volt or in the case of over voltage or over current conditions to tend to reduce the potential below the 1 volt normal level. One way to accomplish the above is to provide a positive and negative source of voltage connected through two current limiting resistors, the positive source connected to the predetermined point directly through its resistor and the negative source connected through its resistor and a diode poled to conduct from the positive source to the negative source. Some of the diode gates are connected to one side of this latter diode and some to the other side as described below in connection with FIG. 5.

FIG. 5 shows how various feedback voltages are derived in order to provide voltage programming, current programming, over-voltage control and over-current control. A control tube 25 including a plate 27, grid 28 and cathode 29 (heated by suitable means, not shown) is controlled over line 37 connected to grid 28 and receives plate voltage from a suitable source represented by battery 23. The constant current is supplied by a second vaccum tube 26 including a plate 32, a grid 31 and a cathode 30 (heated by suitable means, not shown). A suitable supply voltage is provided by a suitable source represented by battery 24. Constant current is determined by means of grid bias battery 35 and cathode resistor 34 as described above. The bipolar output from this two tube circuit is applied to output terminals 49 and 50. Voltage sensing terminals 49′ and 50′ are used for control circuit connections. This circuit is particularly intended for a high voltage, bipolar power supply with independent output voltage and current control and maximum current and voltage limiting in all four quadrants of the operating E, I domain (see FIG. 4). In order to provide for current control and overcurrent limiting two current sensing resistors, 42 and 43, are connected in series in the output line going to common output sensing terminal 50′. The over-current sensing is taken across resistor 43 over line 48 while the current control sensing is taken across both resistors 42 and 43 in series over line 47. The voltage feedback circuits are also referenced to output sensing terminal 50′ and comprises two circuits branched from lead 38 taken from load voltage sensing terminal 49′; one, the voltage control line 64 being taken through resistor 39 shunted by lag capacitor 40 in series with resistor 41; and the other, the over-voltage line 46 taken at the junction between attenuator resistors 44 and 45.

FIG. 5 also contains a simplified schematic showing the amplifiers and gates used to provide the operative four quadrant control and limiting circuits. A driver amplifier 58 provides a control output over line 37 to grid 28 of control tube 25. In order to understand the operation of the important features of the invention it is assumed that amplifier 58 has a very high gain so that at its input line 57 the control voltage is always very close to a characteristic voltage, say 0.5 volt. In the discussion that follows, for the sake of clarity of the explanation it will be assumed that all diodes (used as gates) have a forward drop of 0.5 volt. Thus, the operating potential at junction point 52 will be 1.0 volt.

Junction point 52 receives a current from a positive source of voltage (+ 15v) through current limiting resistor 51. Three gate diodes 59–60, 70–71 and 78–79 are connected with their respective anodes 59, 71 and 79 directed to junction point 52. The gate diode seeing the least positive potential will control the potential of junction point 52 since any gate seeing a higher potential will block this potential due to its cathode to anode direction of connection. Consider the over-voltage (negative) limiting. The sensed voltage over lead 46 is applied to the non-inverting input of amplifier 69 while a negative reference voltage is applied to its inverting input. As long as the output voltage is greater than the reference (less negative) the output of amplifier 69 will be positive generally sitting at its positive output saturation voltage. However, if the output voltage approaches a negative limit as determined by the setting of a negative reference, the output of amplifier 69 will start to fall and when it reaches a point which is less positive than 0.5 volt this gated voltage through gate diode 70–71 will assume control preventing the output of the power supply from going any further negative by controlling amplifier 58 through its input diode 55–56.

The over current control is provided by amplifier 77 operating through gate diode 78–79 to junction point 52. The overcurrent sensing lead 48 is connected to the inverting input of amplifier 77 and an adjustable positive reference is connected to the non-inverting input. This provides the positive over-current limit since the polarity of the current feedback is opposite to that of the over-voltage feedback. When the current approaches the preset reference positively the output of amplifier 77 starts to drop and takes control when the output starts to drop below 0.5 volt.

In order to provide the required control from the other control means, namely, the output voltage control, the output current control, positive over-voltage and negative over-current, a control line 54 is connected through diode gate 59–60 to junction point 52, and all of the controls just named are gated anode to cathode to this line and a source of negative bias current is applied to it from a negative voltage source (−15v.) through current limiting resistor 53. control by the feedback circuits connected to line 54 is exerted by the least negative (more positive) voltage coupled through one of the anode to cathode gate diodes. The control will be exerted by the circuit providing plus 1 volt through its gate to line 54 which in turn will sit at 0.5 volt and through gate diode 59–60 will control junction point 52 at plus 1 volt.

Four feedback circuits are gated to line 54. The output voltage control feedback line 64 is connected to the non-inverting input of comparison amplifier 61 while the bipolar control voltage from source 85 connected through resistor 86 is applied to the non-inverting input and the output is coupled to line 54 through the anode 62 to cathode 63 gate diode. The output current control feedback over line 47, being of opposite polarity, is applied to the inverting input of amplifier 65, a bipolar control voltage from source 87 is connected to the non-inverting input through switch 88–89 when switched to current control position and the output is coupled through the anode 66 to cathode 67 gate diode, over line 68 to line 54. The voltage limit feedback over line 46 is applied to the non-inverting input of amplifier 73; an adjustable positive limit reference voltage is applied to the inverting input and the output is coupled through anode 74 to cathode 75 gate diode over line 76 to line 54. The current limit feedback line 48 is applied to the inverting input of amplifier 81, an adjustable negative limit reference is applied to the non-inverting input and the output is coupled through anode 82 to cathode 83 gate diode over line 84 to line 54. All of the above mentioned polarities are with respect to common sensing terminal 50′.

As mentioned above, undesirable or impractical conditions can develop in a bipolar power supply subjected to simultaneous voltage and current control. Accordingly, means are provided to select voltage or current control or programming each to the exclusion of the other. Means for doing this is double-pole double-throw switch 88–89–90–91–92–93. With switch arms 88 and 93 in their upper positions, as shown, voltage control of the power supply is provided since arm 93 closing to contact 92 closes the circuit from bipolar voltage control source 85 through input resistor 86 to the non-inverting input of voltage control amplifier 61 thereby providing bipolar voltage control of the power supply. At the same time switch arm 88 closed to contact 90 places negative 15 volts at terminal 94 over lead 95 to the non-inverting input of current amplifier 65 thereby cutting off current control of the power supply leaving the voltage programming or control unaffected by the current control circuit. In a similar manner, exclusive current control or programming is provided by moving switch arms 88 and 93 to their lower positions. When this is done, the bipolar current programming source 87 is connected through contact 89 and switch arm 88 to the non-inverting input of current control amplifier 65 thereby providing bipolar current programming of the power supply. At the same time any possible effect of the voltage control through amplifier 61 is removed by the negative bias on terminal 94 applied over lead 95, through switch contact 91 to arm 95 and through resistor 86 to the non-inverting input of amplifier 61. In this way voltage control is cut-off so that the bipolar current programming is in exclusive control. However, the voltage limit (+ and −) and the current limit (+ and −) amplifiers will exert overriding influences should either the voltage or current requested at output terminals 49–50 exceed the preset limits on the limit controls.

Restating the general operation of the bipolar power supply described above, the power supply output is exclusively programmed or controlled in either bipolar voltage mode or bipolar current mode while at the same time adjustable positive and negative voltage and current limits are provided. The diode gating as described above insures this overall operation.

Figure 6:
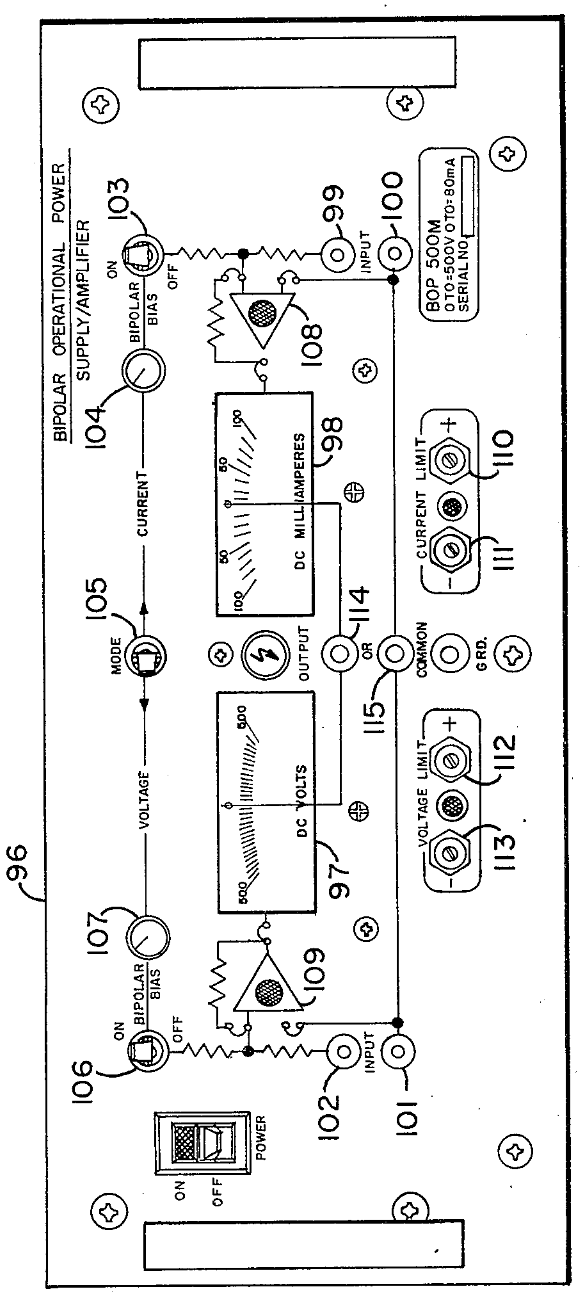
FIG. 6 shows one form of front panel layout suitable for the invention.

FIG. 6 shows one form of front panel layout suitable for the invention described above. Front panel 96 carries a center-reading voltmeter 97 for observing the direct current component of the output voltage and a center-reading current meter 98 for observing the direct current component of the output current. Input terminals for current programming 99 and 100 and input terminals for voltage programming 101 and 102 are provided. Switch 103 when in its up position (ON), connects an internal bipolar reference for current control through bias control potentiometer 104 to mode selector switch 105 while switch 106 when in its up position, connects a bipolar reference for voltage control through bias control potentiometer 107 to mode selector switch 105. Mode selector switch 105 selects either current or voltage control (corresponding to switch 88 through 93 in FIG. 5). The current mode amplifier is shown diagrammed as 108 and the voltage mode amplifier as 109. The adjustable current limit controls are 110 for positive limit and 111 for negative limit. The voltage limit controls are 112 for positive limit and 113 for negative limit. The output binding posts are at 114 and 115. The various lines and resistors shown on the panel are to illustrate the actual internal connections. Thus, the front panel shows the basic organization of the power supply controls and terminals as an assist in using same.

While the preferred form of the invention shown in FIG. 5 employs vacuum tubes for current source and control, transistors may also be used. Other modifications are anticipated which fall within the scope of the invention as set forth in particular in the appended claims.

I claim:

1. In a bipolar regulated power supply, the combination of;

a pair of load terminals;

a source of first DC current of a first polarity connected through a current sensing resistor and across said load terminals;

a source of a second DC current of a polarity opposite to said first polarity connected to said load terminals through said current sensing resistor;

current control means connected in series with said source of said second current capable of controlling said second current from a value equal to a small fraction of the value of said first current to a value substantially twice the value of said first current whereby bipolar voltage or current is provided to said terminals;

wherein said control means includes; a voltage control amplifier for receiving a sample of the terminal voltage and comparing it with a first bipolar reference for controlling the voltage across said terminals in accordance with said comparison; a current control amplifier for receiving a sample of the terminal current and comparing it with a second bipolar reference for controlling the current to said terminals in accordance with said comparison; adjustable positive overvoltage control means; adjustable negative overvoltage control means; adjustable positive overcurrent control means; adjustable negative overcurrent control means;

and means for exclusively selecting control by said voltage control amplifier or said current control amplifier while retaining all four overvoltage or overcurrent control means.

2. A bipolar regulated power supply as set forth in claim 1, and wherein;

said adjustable overvoltage and overcurrent control means include independently adjustable references and amplifiers for comparing feedback voltages and currents with said references;

whereby each of the four overvoltage and overcurrent limits can be set independently.

3. A bipolar regulated power supply as set forth in claim 1, and wherein;

each of said control means includes a comparison amplifier for comparing a reference voltage with a feedback voltage and output gating means from said amplifiers to said current control means whereby one of said amplifiers is in exclusive control of the voltage or current to said load terminals.

4. A bipolar regulated power supply as set forth in claim 1, and wherein;

said current control means includes at least one vacuum tube.

5. A bipolar regulated power supply as set forth in claim 1, and wherein;

said adjustable control means provide voltage or current limiting from substantially zero voltage or current to the maximum safe limits of positive or negative voltage or current for the power supply.

* * * * *